No. 631,064. Patented Aug. 15, 1899.
A. E. DART.
UNION COUPLING.
(Application filed Apr. 17, 1899.)
(No Model.)

WITNESSES.
A. D. Grover
Fred E. Dorr.

INVENTOR.
Albert E. Dart
by H. E. Teschemacher
Atty.

UNITED STATES PATENT OFFICE.

ALBERT E. DART, OF BRIDGETON, RHODE ISLAND, ASSIGNOR TO THE A. E DART UNION COMPANY, OF WOBURN, MASSACHUSETTS.

UNION-COUPLING.

SPECIFICATION forming part of Letters Patent No. 631,064, dated August 15, 1899.

Application filed April 17, 1899. Serial No. 713,407. (No model.)

*To all whom it may concern:*

Be it known that I, ALBERT E. DART, a citizen of the United States, residing at Bridgeton, in the county of Providence and State of Rhode Island, have invented certain new and useful Improvements in Union-Couplings, of which the following is a specification.

My invention has for its object to provide a union-coupling for pipes of various kinds in which the packing-ring will be held more securely than heretofore and may be easily removed and replaced by another of the same or different substance.

A further object of the invention is to enable the two members of the coupling to be moved out of alinement without disturbing the packing or causing leakage at the joint.

To this end my invention consists in a coupling comprising two opposing members, one having a convex and the other a concave face held together by a nut or by means of flanges and bolts and a concavo-convex packing interposed between said members, whereby a perfectly tight joint is secured, the members of which can be moved out of alinement without producing leakage, as hereinafter more fully set forth.

Figure 1:
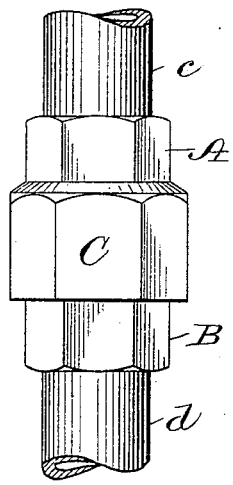
Figure 2:
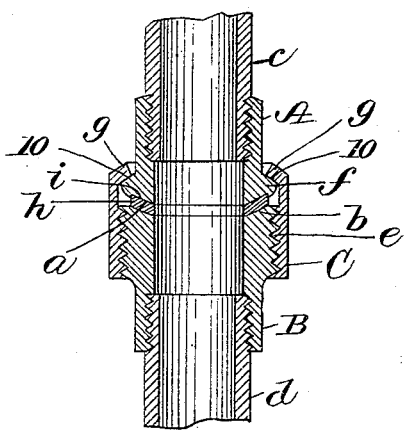
Figure 3:
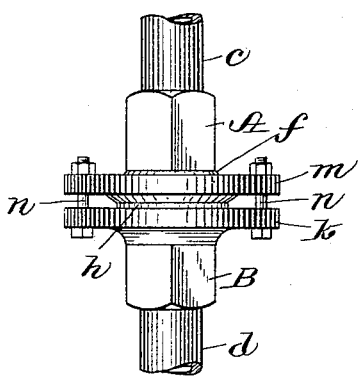
Figure 4:
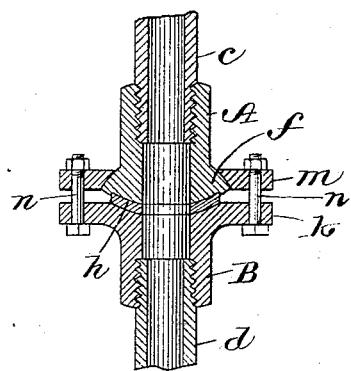

In the accompanying drawings, Figure 1 is a side elevation of my improved union-coupling. Fig. 2 is a longitudinal vertical section of the same. Fig. 3 is a side elevation illustrating a modified form of my coupling. Fig. 4 is a longitudinal vertical section of the same.

In Figs. 1 and 2 of the said drawings, A represents the male member of the coupling, which is provided with a convex face $a$, and B represents the female member, having a concave face $b$, which forms a seat for the packing, to be hereinafter described, said members being interiorly threaded to receive the corresponding threaded ends of the pipe $c\ d$, which are connected by means of the coupling.

C is the coupling-nut, which is interiorly threaded, as usual, at $e$, the female member B being correspondingly threaded to engage the threaded portion of the nut, while the male member is provided with a flange $f$, having an outer convex or beveled bearing-surface 10, against which rests the correspondingly curved or concave interior surface of the inwardly-projecting flange $g$ of the coupling-nut C, which thus holds the two members A B together in such manner as to permit of a movement of the one upon the other in the arc of a circle if thrown or moved out of alinement by accident or design.

Between the opposing convex and concave faces of the members A B is placed a concavo-convex packing-ring $h$, which is preferably fitted within a shallow recess $i$, formed in one of the members, as shown in Fig. 2, whereby it is held firmly in position without liability of displacement under any movement in the arc of a circle of the opposing convex and concave faces of the two members, perfect security being thus afforded against leakage in case the pipes connected by said coupling should be thrown out of alinement or it should be found necessary to connect them when not in a perfectly straight line.

The packing between the two members may, if desired, consist of two concavo-convex packing-rings placed together, each packing-ring being fitted into a recess in the face of the member against which it rests and said packing-rings being adapted to slide one upon the other when the two members of the coupling are moved out of alinement. This duplex packing is well adapted for use when the coupled pipes are employed to convey ammonia or acids, in which case the packing-rings would be formed of lead or other suitable substance free from liability to become corroded by the liquid passing through the pipes.

Figs. 3 and 4 illustrate a modification of my invention which may be preferred in some cases, as it admits of a greater range of movement in the arc of a circle of one member upon the other. In this example the opposing faces of the two members of the coupling are provided, respectively, as before, with convex and concave faces; but instead of being held together by a coupling-nut, as previously described, they are connected by means of flanges $k\ m$, spaced apart, and bolts $n$, the flange $k$ being formed integral with the female member B, while the flange $m$ consists of an independent annulus or ring loosely slipped over the outer end of the male member A and taking a bearing against its flange or shoulder *f*, the surface of which is convex and forms a seat for the correspondingly concaved or beveled inner periphery of the ring-shaped flange *m*. The packing-ring does not extend between the flanges *k m*, which are spaced apart when held by the bolts *n*, and consequently the packing does not in any manner interfere with the free movement in the arc of a circle of one member upon the other when moved out of alinement, which movement can be effected without producing any leakage whatever, which would surely occur under like circumstances with the ordinary flange-coupling in common use. Heretofore in connecting two pipes with a flange-coupling if the flanges did not happen to abut squarely against each other it has frequently been customary to turn off one or both faces at an angle to insure the proper fit; but with my improved construction this is entirely unnecessary, as a perfect joint can be effected without leakage owing to the capability of moving one member of the coupling upon the other in the arc of a circle in the manner described.

What I claim as my invention, and desire to secure by Letters Patent, is—

1. A union-coupling for pipes, comprising two opposing members, one having a convex, and the other a concave face, means for coupling said members together, whereby they are permitted to move independently of each other in the arc of a circle, and a readily-removable concavo-convex packing-ring interposed between said two members, substantially as described.

2. A union-coupling for pipes comprising two opposing members, one having a convex, and the other a concave face, means for coupling said members together, whereby they are permitted to move independently of each other in the arc of a circle, and a concavo-convex packing-ring interposed between said two members, and fitted readily removable within a recess in the face of one of said members and held from lateral displacement thereby, substantially as described.

3. In a pipe-coupling, the combination of two opposing members, one having a convex, and the other a concave face, and one of said members having a flange or shoulder forming an outer convex bearing-surface, a readily-removable concavo-convex packing-ring interposed between the opposing faces of the two members, means for preventing lateral displacement of the packing-ring and a coupling device for holding said members together in such manner as to permit them to move independently of each other in the arc of a circle, said coupling device having a bearing-surface fitting over the convex bearing-surface of the flange or shoulder of one of said members, substantially as described.

4. In a pipe-coupling, the combination of two opposing members, one having a convex, and the other a concave face, and one of said members having a flange formed integral therewith, and the other member being provided with a shoulder having an outer convex or beveled bearing-surface, and a detachable flange or ring fitting over and movable upon said convex bearing-surface, said flanges being spaced apart, a concavo-convex packing-ring interposed between said members, and bolts passing through the stationary and movable flanges for holding the two members of the coupling together, substantially as described.

Witness my hand this 10th day of April, A. D. 1899.

ALBERT E. DART.

In presence of—
P. E. TESCHEMACHER,
M. B. WILSON.